US008485481B2

(12) United States Patent
M. Carter Alston

(10) Patent No.: US 8,485,481 B2
(45) Date of Patent: Jul. 16, 2013

(54) LID SUPPORT DEVICE

(76) Inventor: Shirley M. Carter Alston, Glen Burnie, MD (US)

( * ) Notice: Subject to any disclaimer, the term of this patent is extended or adjusted under 35 U.S.C. 154(b) by 77 days.

(21) Appl. No.: 12/820,407

(22) Filed: Jun. 22, 2010

(65) Prior Publication Data

US 2011/0309218 A1 Dec. 22, 2011

(51) Int. Cl.
*A47B 96/06* (2006.01)

(52) U.S. Cl.
USPC ................ 248/226.11; 248/176.2; 248/213.1; 248/229.26; 294/12; 220/263

(58) Field of Classification Search
USPC .......... 248/226.11, 176.2, 229.26; 211/41.11; 220/263, 379, 744
See application file for complete search history.

(56) References Cited

U.S. PATENT DOCUMENTS 498,569 A * 5/1893 Peterson ........................ 16/382
1,258,503 A * 3/1918 Tritle ............................. 16/233
2,528,866 A * 11/1950 Dawson, Jr. .................... 402/33
2,664,490 A * 12/1953 Allgeyer .................... 219/450.1
2,779,114 A * 1/1957 Orthwine ........................ 40/658
3,149,636 A * 9/1964 Rankin .......................... 402/33
3,850,331 A * 11/1974 Oxel ............................ 220/832
4,279,357 A * 7/1981 Robinson ...................... 220/318
4,375,711 A * 3/1983 Franzen et al. ................. 16/252
4,528,998 A * 7/1985 Gamm ........................... 135/75
4,773,555 A * 9/1988 Merino ......................... 220/379
4,915,433 A 4/1990 Schafer
4,971,220 A * 11/1990 Kaufman et al. ............. 220/832
5,236,760 A * 8/1993 Jinn ............................. 428/100
5,414,911 A * 5/1995 Adams ........................... 24/545
5,655,270 A * 8/1997 Boisvert .......................... 24/336
5,683,010 A * 11/1997 Boyajian, Jr. ................. 220/744
6,098,492 A * 8/2000 Juchniewicz et al. ........ 74/551.3
6,234,067 B1 * 5/2001 Schmidt .......................... 99/426
6,490,768 B1 * 12/2002 Goodall .......................... 24/334
6,505,487 B1 * 1/2003 Garel et al. ....................... 70/18
6,763,965 B2 * 7/2004 Parenteau ..................... 220/263
7,267,308 B1 * 9/2007 Jenson ....................... 248/176.1
7,284,733 B2 * 10/2007 Parenteau .................. 248/213.2
7,419,129 B2 9/2008 Kixmoeller
D614,946 S * 5/2010 Herman .......................... D8/395
8,091,845 B2 * 1/2012 Di Lollo .................... 248/213.2
2004/0129715 A1 * 7/2004 Bogdanovich ................ 220/843
2004/0187698 A1 9/2004 Parenteau
2009/0230134 A1 * 9/2009 Romandy .................. 220/573.1
2010/0193523 A1 * 8/2010 Beisheim ...................... 220/379

FOREIGN PATENT DOCUMENTS

FR 2890842 A1 3/2007
GB 2326081 A 12/1998
WO WO9204848 A1 8/1991

* cited by examiner

*Primary Examiner* — Terrell McKinnon
*Assistant Examiner* — Daniel J Breslin
(74) *Attorney, Agent, or Firm* — The Law Firm of Andrea Hence Evans, LLC

(57) ABSTRACT

A lid support device and method for supporting a container lid for a container. The lid support device features a handle connected to a fan shaped lid rest. The lid rest comprises a clip. The clip extends through the container and the container lid to secure the device to the container lid and the container. The handle height is adjustable so that the handle and lid rest support the container lid when it is not covering the container. The device features a base that is the mirror image shape of the lid rest.

4 Claims, 5 Drawing Sheets

500
100
161
140
300
300
300
300
120
500
530
160
165
520
168
153
510
170
162
163
172

LID SUPPORT DEVICE

FIELD OF THE INVENTION

The present invention relates in general to a device for supporting a lid of a container.

BACKGROUND OF THE INVENTION

After food is cooked, the cook often likes to remove the food from the pot and place the food in a different container. The food may be placed in a cooking container such as a pan to be transported to a different location such as a party or an outdoor event. Or the food may initially be cooked in a pan and placed in a central area for enjoyment. A common inexpensive pan often used is a roil pan. These pans may include a lid made of plastic or the lid may also be made of foil so that the lid wraps around the edges of the pan to cover the food inside the pan. These pans and lids come in various shapes and sizes ranging from circular, rectangular, or square, for example. The pans are ideal for cooking, transporting, freezing, reheating and serving food.

The lids typically remain on the pans until the food is ready to be served or enjoyed. However, once the lid is removed, its placement becomes a problem. When plastic lids are removed from the pan, there is usually a question as to where they should be stored so they can be reapplied to the pan after everyone's food has been removed. Plastic lids are too large and bulky to sit on the same table where the food is being served. Also, it appears unattractive on the dinner table and at parties and events. The plastic lids are removed from the pans and the food may be exposed for unnecessary time periods. To conserve heat, the lid should remain on the pan to keep the food at its proper temperature level. Also, for cleanliness purposes, the lids need to be applied immediately after someone removes food from the pan. This will help to prevent bugs and germs from entering the pan.

Plastic lids consume a lot of storage space when they are not in use on the pan. Some may replace the plastic lid with flimsy foil paper. Similarly, the foil lids are flimsy and like foil paper they lose their shape after they are removed from the pan. Users often try to shape the foil back to its original shape and size but this is time consuming and often impossible and unattractive. Additional foil is wasted and used to cover the pans. Each time a person removes food from the pan, additional foil is used to cover the food because the person would have altered the shape of the foil.

SUMMARY OF THE INVENTION

This invention introduces a device that handles, supports and stores the lids to containers, whereby the lids can remain within reach so the lids can be readily and easily reapplied to the containers.

An aspect of an embodiment of the invention provides a device for supporting a container lid having an adjustable handle, lid rest, clip and base.

A further aspect of an embodiment of the invention provides a device for supporting a container lid that connects the container lid to the container when the device is in use.

A further aspect of an embodiment of the invention provides a method of supporting a container lid when the lid is removed from the container to ensure the lid does not take up needed space, the lid is not lost after it is removed and is not damaged or misshaped.

Additional aspects, objectives, features and advantages of the present invention will become apparent from the following description of the preferred embodiments with reference to the attached drawings.

DETAILED DESCRIPTION OF THE INVENTION

Figure 1:
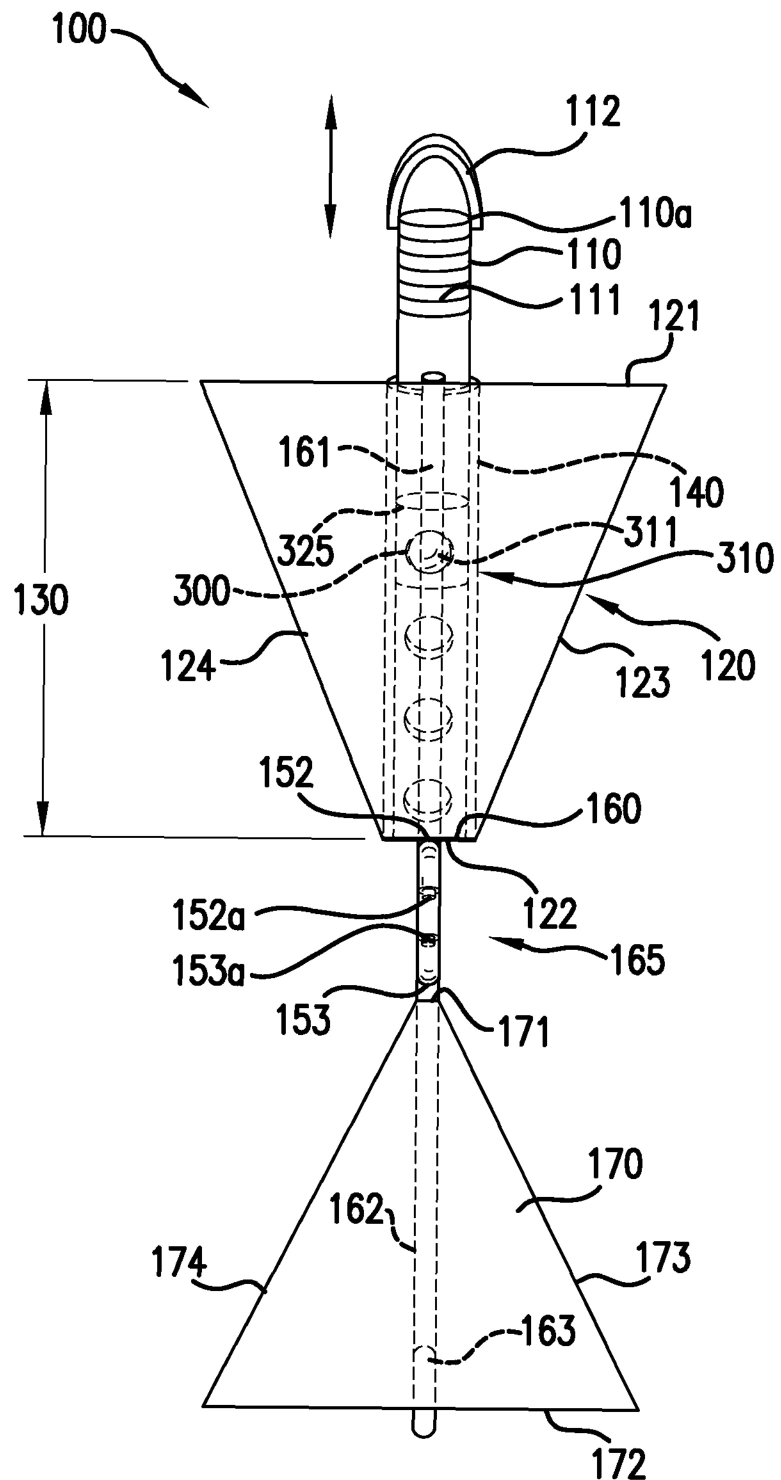
FIG. 1 is a front isometric view of a device for supporting a container lid for a container.
Figure 4:
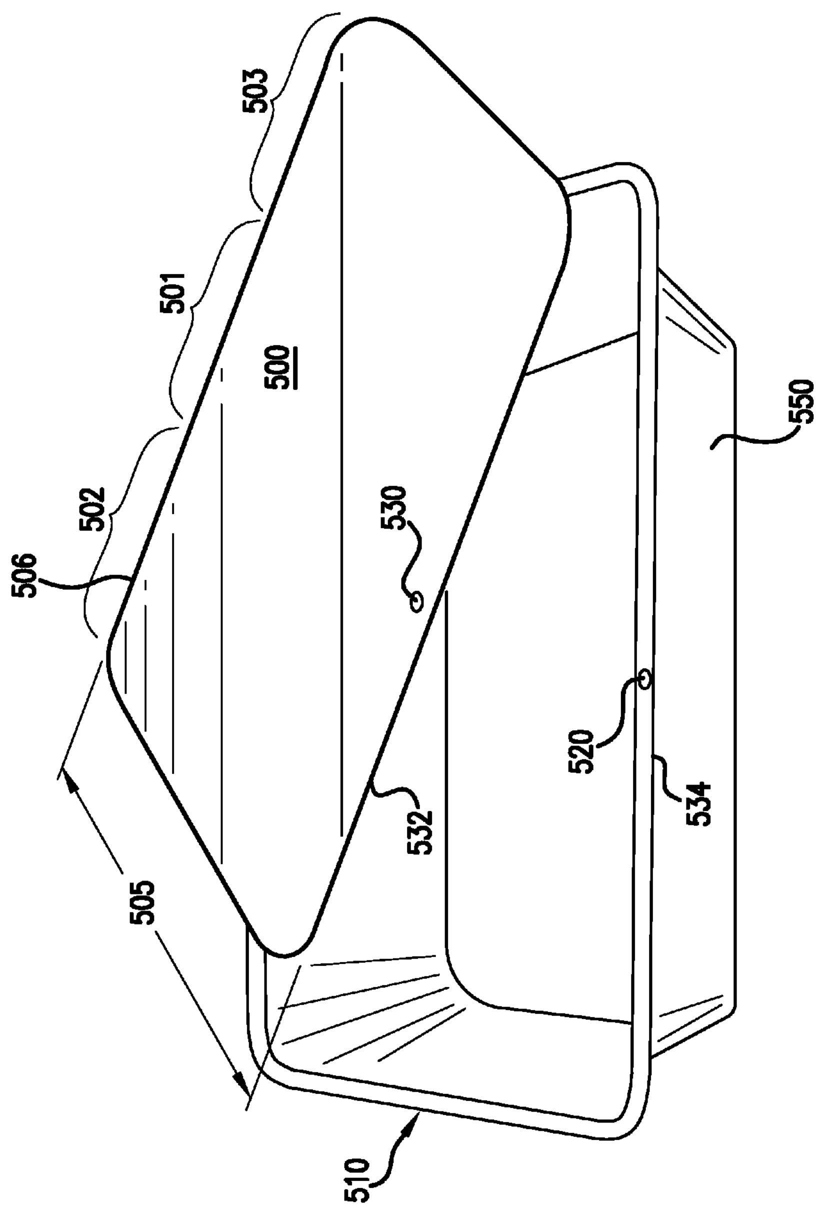
FIG. 4 illustrates a container used with an embodiment of the invention.

Referring to the figures, FIG. 1 is a front isometric view of a device 100 for supporting a container lid 500 for a container 510, shown in FIG. 4. The device 100 comprises a handle 110. The handle 110 has raised ridges 111 at a top portion of the handle to improve gripping of the device. The ridges 111 extend around the front, sides and back of the handle at the top portion. The handle 110 also includes a looped portion 112. The looped portion 112 is used to hang the device on an object such as a hook, for example. Also, the looped portion 112 is sized to lit a user's finger in the looped portion 112 for handling of the device 100. The handle 163 can also be used to handle the device and hang it when it is not in use. The handle 110 is connected to a lid rest 120. The lid rest 120 is fan-shaped. The lid rest 120 supports the container lid 500 when the device 100 is in use. The device is in use when it is supporting a container lid 500 when the lid 500 is removed from a container 510. The fan-shape of the lid rest 120 comprises a parallel top 121 and a parallel bottom 122. The sides 123, 124 extend outward and connect the top 121 and bottom 122 to form a fan shape. The lid rest 120 allows the container lid 500 to rest on it. The middle section 501 of the container lid 500 comes into physical contact the lid rest 120. The container lid end sections 502, 503 extend outward and the end sections 502, 503 do not physically contact the lid rest 120.

The handle 110 also comes into physical contact with the middle section 501 of the container lid 500 if the container lid width 505 is larger than the lid rest width 130. The handle 110 acts as an additional support for the container lid 500. In an extended position, the handle 110 and the lid rest 120 allows the lid 500 to rest against them. In one embodiment of the invention, the top portion of the handle 110*a* is positioned so that it is aligned with the edge 506 of the container lid 500. In this position, when the lid 500 is resting on the lid rest 120 and further supported by the handle 110, a view of the device 100 is fully obstructed by the lid. The handle 110 is adjustable such that the user can align the top portion 110*a* of the handle 110 with the edge of the container lid or move the handle to a desired height. If the lid width 500 is equal to the lid rest width 130, then the edge 506 of the container lid 500 is aligned with the top 121 of the lid rest 120. In this case, the user may desire to position the handle 110 inside of the lid rest 120 since the handle 110 is not in use, as shown in FIG. 2.

Figure 2:
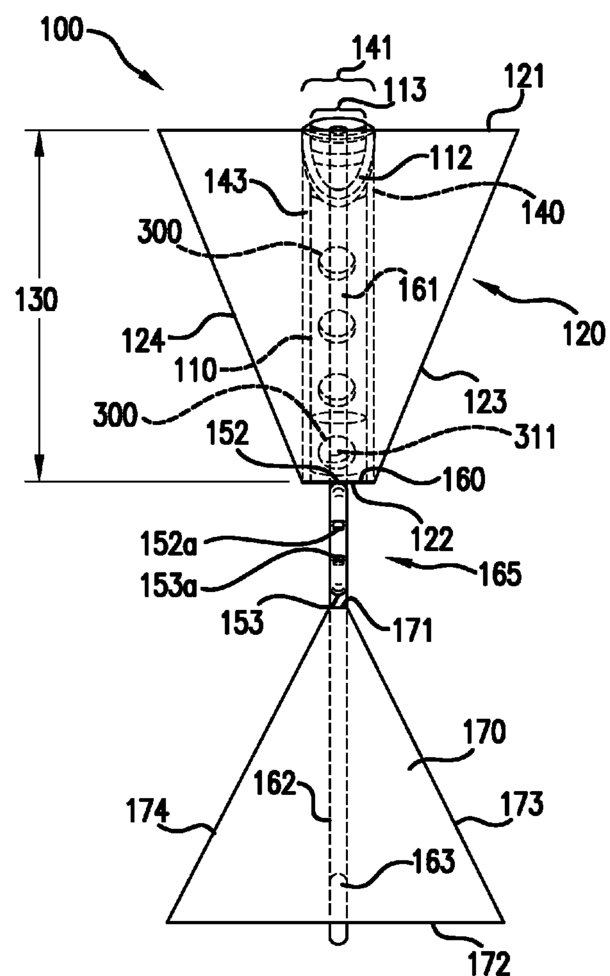
FIG. 2 illustrates the handle of a device for supporting a container lid for a container positioned inside of the lid rest of the device.

FIG. 2 illustrates the handle 110 of the device 100 positioned inside of the lid rest 120. The lid rest 120 further comprises a stationary acceptor 140 attached to the back side of the lid rest 120. The stationary acceptor width 141 is wider than the handle width 113 so that the handle 110 slides along the inside of the acceptor 140. To adjust the handle 110, the looped portion 112 is rotated downward against the handle 110 so that it is flush against the handle 110. Alternatively, in an alternative embodiment the looped portion 112 is not attached to the device 100 and the handle 110 is moved freely in an upward and downward direction to a desired height.

Figure 3:
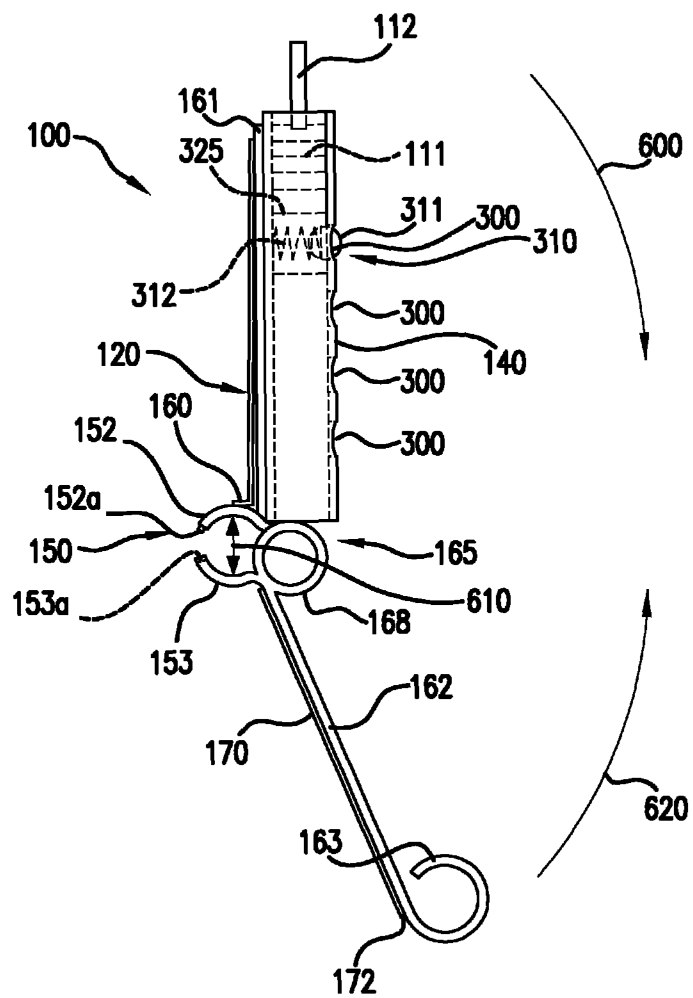
FIG. 3 is a side view of the device for supporting a container lid for a container.

FIG. 3 is a side view of the device 100 for supporting a container lid 500 for a container 510. The stationary acceptor 140 contains apertures 300. The apertures 300 are equally spaced. The handle 110 comprises a node mechanism 310. The node mechanism 310 is located on a back side of the handle 110. Node mechanisms 310 comprise a node 311 attached to a spring 312. To lock the handle 110 at a desired height, the handle 110 is moved in an upward or downward direction until the node mechanism 310 is aligned with the apertures 300. In a locked position, the node 311 extends outward through the aperture 311. To adjust the handle 110, the user exerts pressure on the node 311 that extends outward by pushing the node 311 inside of the node box 325. The spring 312 allows the node to move inward. The handle 110 can be moved upward or downward until the node 311 is aligned with an aperture 300. When the handle 110 is in a fully extended position, the node 311 is in the first aperture 300, as shown in FIG. 3. A single aperture 300 and node mechanism 310 have been described. However, it is understood that multiple apertures are features of the device and have the same features and purpose as the single aperture described. The device can be manufactured in a manner such that the handle can be extended to a desired height to accommodate the width of a container lid. The number of apertures and their spacing depends on the desired extension of the handle. Multiple node mechanisms may be added to the device.

As shown in FIGS. 1 and 3, the lid rest 120 is secured to a clip mechanism 165 featuring a clip ISO. The clip 150 is a durable and flexible and is a material that is safe aluminum or heavy gauge steel. Similarly, the device 100 is an aluminum or heavy gauge steel. In the event the clip 150 or device 100 comes into contact with the food inside the container 510, the user will not have to worry that the clip 150 will contaminate the food. The clip 150 is secured to the lid rest 120 by a clip mechanism 165. The clip mechanism 165 features spring loaded clip legs 161, 162. The bottom portion of clip leg 162 features a handle 163. When pressure is exerted on the legs 161, and 162 the clip arms 152, 153 open. Arm 161 extends from the top of the lid rest 120. The spring 168 fits between the top of the device 100 and the base 170. The clip 150 is a spring clip but a different type of clip may be used to connect the lid 510 to the container 500. Pressure is exerted when the user pulls leg 161 towards leg 162 shown at 600. The leg 161 features clip arm 152. Leg 162 features clip arm 153. When the legs 161 and 162 are pulled towards each other, spring allows the clip arms 152 and 153 to move in an upward and downward direction such that the clip arms 152 and 153 open and close as shown at 610. When the user moves leg 161 toward leg 162, clip arm 152 will move in an upward direction. When the user moves leg 162 toward 161 shown at 620, clip arm 152 will move in a downward direction. User can grasp handle 163 and move leg 162 towards clip leg 161. The handle 163 provides an easy grip. The clip 150 is extended through the container 510 and the container lid 500 when the device 100 is in use. The clip arms 152, 153 mate such that the opening 153*a* is sized to receive the end 152*a* of clip arm 152.

Figure 5:
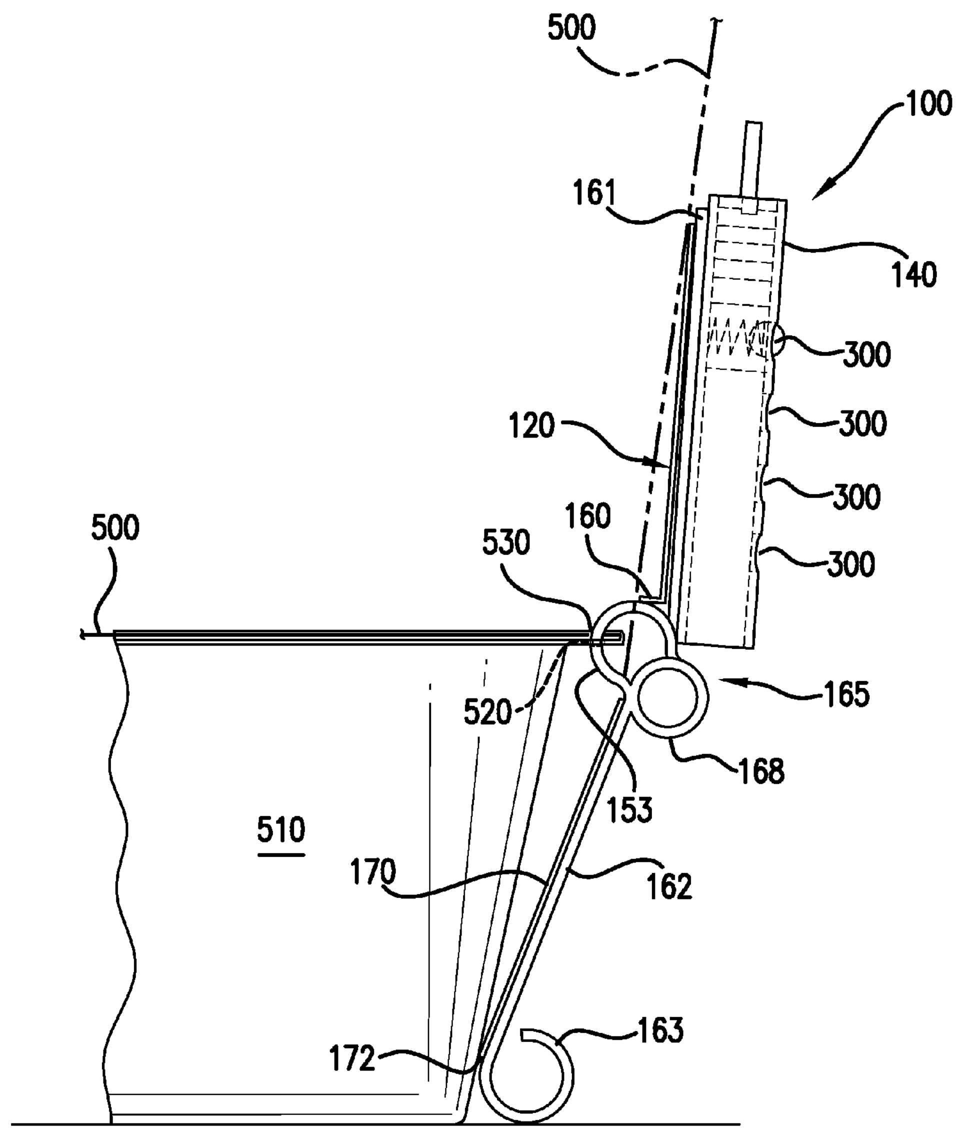
FIG. 5 illustrates a side view of device for supporting a container lid for a container in use attached to a container.

The clip 150 is located between the lid rest 120 and the base 170 on the handle 110. The base 170 aids in attaching the lid support device 100 to the container 510. The base 170 shape is an inverted mirror image of the lid rest 120. As shown the base 170 is an inverted symmetrical fan shape. The fan-shape of the base 170 comprises a parallel top 171 and a parallel bottom 172. The sides 173, 174 extend outward and connect the top 171 and bottom 172 to form an inverted fan shape. When the device 100 is in use, the base 170 abuts the container side 550. As shown in FIG. 5, when the device 100 is attached to the container 510 and lid 500, the bottom 172 of the device 100 touch the side 500 of the container on the side underneath the container hole 520.

The lid rest further comprises a lip 160. The lip 160 extends or protrudes outward from a bottom portion of the lid rest 120. The lip 160 supports a bottom portion 532 of the container lid 500. The device 100 is sized such that when the device 100 is connected to the container 510 and container lid 500 contacts the upper side edge 534 of the container 510 at the edge portion near the container hole 520. The lip 160, clip 150 and the base 170 aid in the connection and securing of the device 100 to the container 510 and container lid 500.

FIG. 5 illustrates the device IOU for supporting a container lid 500 for a container 510 in use attached to a container 510. As shown, the device 100 supports the container lid 500 when the lid 500 is removed from the container 510. The container 500 has a container hole 520 and the container lid 500 has a container lid hole 530. The container hole 520 and container lid hole 530 are positioned so that the clip 150 can easily connect the lid 500 and container 510. The holes 520 and 530 are sized so that the clip arms 152 and 153 can extend through the holes 520 and 530 to secure the lid 500 and container 510. The clip 150 acts as a hinge and allows the container lid 500 to rotate around the body of the clip 150. The device 100 can remain attached to the container 510 and lid 500 when the lid 500 is covering the container 510. The device 100 allows the user to easily open and close the lid and provides a resting place for the lid when the lid is in an open position. In a closed position, the lip 160 abuts the container edge 534, the clip 150 remains connected to the lid 500 and container 510 and the handle 110 can remain a desired height. The lid 110 does not rest on the lid rest 120 in closed position.

The device 100 can be connected to the device by the clip 150 until the lid 500 is removed. Once the lid 500 is removed, it can rest on the lid rest 120 and the handle 110 as described above. Alternatively, the lid 500 can rest against the lid rest 120 solely if the lid width 505 is not larger than the lid rest width 130. The handle 110 can remain extended or collapsed inside of the stationary acceptor 140.

FIG. 4 illustrates a container 510 used with an embodiment of the invention. The container 510 shown is a rectangular aluminum foil pan 510 with a board lid 500. However, the container to be used with this device can be any shape, any size or be of a different material. Similarly, the lid can be any shape, any size or be of a different material.

The device is dishwasher safe and helps to safely and efficiently support a container lid of an opened container. No additional table or counter space is used to store the container lid when it is not covering the container.

The invention has been described in detail with particular reference to certain preferred embodiments thereof, but it will be understood that variations and modifications can be effected within the spirit and scope of the invention.

The invention claimed is:

1. A device for supporting a container lid for a container comprising:

a handle connected to a lid rest, wherein a front side of the lid rest receives the container lid, wherein the lid rest further comprises a clip mechanism featuring a first clip arm and a second clip arm and a first clip leg extending from a top of the lid rest and a second clip leg on a bottom area of the device, wherein the first clip leg contacts the first clip arm and the second clip leg contacts the second clip arm, whereby movement of the first and second clip legs towards each other causes the first and second clip arms to open and closing of the first and second clip arms prevents the container lid from being removed: and further comprising an acceptor on a back side of the lid rest which receives the handle wherein the handle is adjustable; and wherein the container lid rests on the lid rest and handle when the device is connected to the container.

2. The device of claim 1 wherein the lid rest further comprises a lip.

3. The device of claim 1 further comprising a base which is an inverted mirror image of the lid rest that makes contact with the container when the device is in use.

4. A device for supporting a container lid for a container comprising:

a lid rest which receives the container lid, the lid rest having a lip that extends outward from the lid rest and a base which is an inverted mirror image of the lid rest wherein the lid rest further comprises a clip mechanism featuring a first clip arm and a second clip arm and a first clip leg extending from a top of the lid rest and a second clip leg on a bottom area of the device, wherein the first clip leg contacts the first clip arm and the second clip leg contacts the second clip arm, whereby movement of the first and second clip legs towards each other causes the first and second clip arms to open and closing of the first and second clip arms prevents the container lid from being removed: and further comprising an adjustable handle and a stationary acceptor, the handle having a node mechanism featuring a node and a spring, wherein the node extends through an aperture on the stationary acceptor when the handle is locked in place.

* * * * *